US012194916B2

(12) United States Patent
Weston et al.

(10) Patent No.: US 12,194,916 B2
(45) Date of Patent: Jan. 14, 2025

(54) COLLECTIVE ZONE LIGHTING FEATURES

(71) Applicant: FORD GLOBAL TECHNOLOGIES, LLC, Dearborn, MI (US)

(72) Inventors: Keith Weston, Canton, MI (US); John Robert Van Wiemeersch, Novi, MI (US); Aaron Bradley Johnson, Allen Park, MI (US); Brendan F. Diamond, Grosse Pointe, MI (US); Stuart C. Salter, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 151 days.

(21) Appl. No.: 18/159,480

(22) Filed: Jan. 25, 2023

(65) Prior Publication Data

US 2024/0246478 A1 Jul. 25, 2024

(51) Int. Cl.
*B60Q 1/24* (2006.01)
*B60Q 1/14* (2006.01)
*H04W 4/46* (2018.01)
*H05B 47/19* (2020.01)

(52) U.S. Cl.
CPC ............ *B60Q 1/247* (2022.05); *B60Q 1/14* (2013.01); *H04W 4/46* (2018.02); *H05B 47/19* (2020.01); *B60Q 2300/05* (2013.01); *B60Q 2300/116* (2013.01); *B60Q 2900/30* (2013.01)

(58) Field of Classification Search
CPC ...... B60Q 1/02–20; B60Q 1/247; B60Q 1/14; B60Q 2300/05; B60Q 2300/116; B60Q 2900/30; H04W 4/46; H05B 47/19
See application file for complete search history.

(56) References Cited

U.S. PATENT DOCUMENTS

| 9,821,707 | B2 | 11/2017 | Decaluwe et al. |
| 10,046,637 | B2 | 8/2018 | Buttolo et al. |
| 10,493,902 | B2 | 12/2019 | Hennes et al. |
| 11,267,396 | B2* | 3/2022 | Dellock ................. G06Q 50/40 |
| 2017/0190284 | A1* | 7/2017 | Na ............................ B60Q 1/44 |
| 2019/0017675 | A1* | 1/2019 | Suwa ....................... F21S 41/24 |
| 2019/0202345 | A1* | 7/2019 | Hennes ................ B60Q 1/1415 |
| 2020/0375006 | A1 | 11/2020 | Erickson et al. |
| 2022/0008576 | A1* | 1/2022 | Sood ....................... G01S 17/08 |

FOREIGN PATENT DOCUMENTS

| DE | 102022101237 A1 | 7/2022 | |
| JP | 7156925 B2 * | 10/2022 | ............. B60Q 1/076 |
| WO | 2022135540 A1 | 6/2022 | |

* cited by examiner

*Primary Examiner* — Abdullah A Riyami
*Assistant Examiner* — Syed M Kaiser
(74) *Attorney, Agent, or Firm* — Joseph Zane; Brooks Kushman P.C.

(57) ABSTRACT

A vehicle for use in collective zone lighting includes a wireless transceiver and a controller. The controller is configured to create a group of vehicles using wireless messaging, via the wireless transceiver, between the vehicle and one or more other vehicles, and instruct the group of vehicles to collectively light an area using exterior lights of a plurality of the group of vehicles.

18 Claims, 15 Drawing Sheets

COLLECTIVE ZONE LIGHTING FEATURES

TECHNICAL FIELD

Aspects of the disclosure generally relate to use of a plurality of vehicles to provide collective zone lighting features.

BACKGROUND

Vehicles may have different kinds of exterior lights. These lights may include headlights and taillights. Some vehicles may also have passive entry features that allow the vehicle to detect a key fob or phone in proximity to the vehicle to unlock the vehicle doors.

SUMMARY

In one or more illustrative embodiments, a vehicle for use in collective zone lighting includes a wireless transceiver and a controller. The controller is configured to create a group of vehicles using wireless messaging, via the wireless transceiver, between the vehicle and one or more other vehicles. The controller is further configured to instruct the group of vehicles to collectively light an area using exterior lights of a plurality of the group of vehicles.

In one or more illustrative embodiments, a method for use in collective zone lighting includes creating, by a lead vehicle, a group of vehicles using wireless messaging, via a wireless transceiver of the lead vehicle, between the lead vehicle and one or more other vehicles; and instructing, by the lead vehicle, the group of vehicles to collectively light an area using exterior lights of a plurality of the group of vehicles.

In one or more illustrative embodiments, a non-transitory computer-readable medium includes instructions for use in collective zone lighting that, when executed by one or more controllers of a lead vehicle, cause the lead vehicle to perform operations including to create, by a lead vehicle, a group of vehicles using wireless messaging, via a wireless transceiver of the lead vehicle, between the lead vehicle and one or more other vehicles, including to send an invitation message to at least subset of the one or more other vehicles, receive, from the one or more other vehicles, a reply message indicating acceptance to join the group of vehicles, and add the accepting vehicles to the group of vehicles. The medium further includes instructions to instruct, by the lead vehicle, the group of vehicles to collectively light an area using exterior lights of a plurality of the group of vehicles, including one or more of receive as input to an human-machine interface (HMI) of the lead vehicle, a specification of which of the exterior lights of the plurality of the group of vehicles to activate and instruct the group of vehicles to turn on the specified exterior lights, receive as input to the HMI of the lead vehicle, a specification to track one or more tracking devices to illuminate locations of the one or more tracking devices, and instruct the group of vehicles to utilize the exterior lights to illuminate the one or more tracking devices, or receive as input to the HMI of the lead vehicle, a specification to illuminate a specific location, and instruct the group of vehicles to utilize the exterior lights to illuminate the specific location.

DETAILED DESCRIPTION

Figure 1:
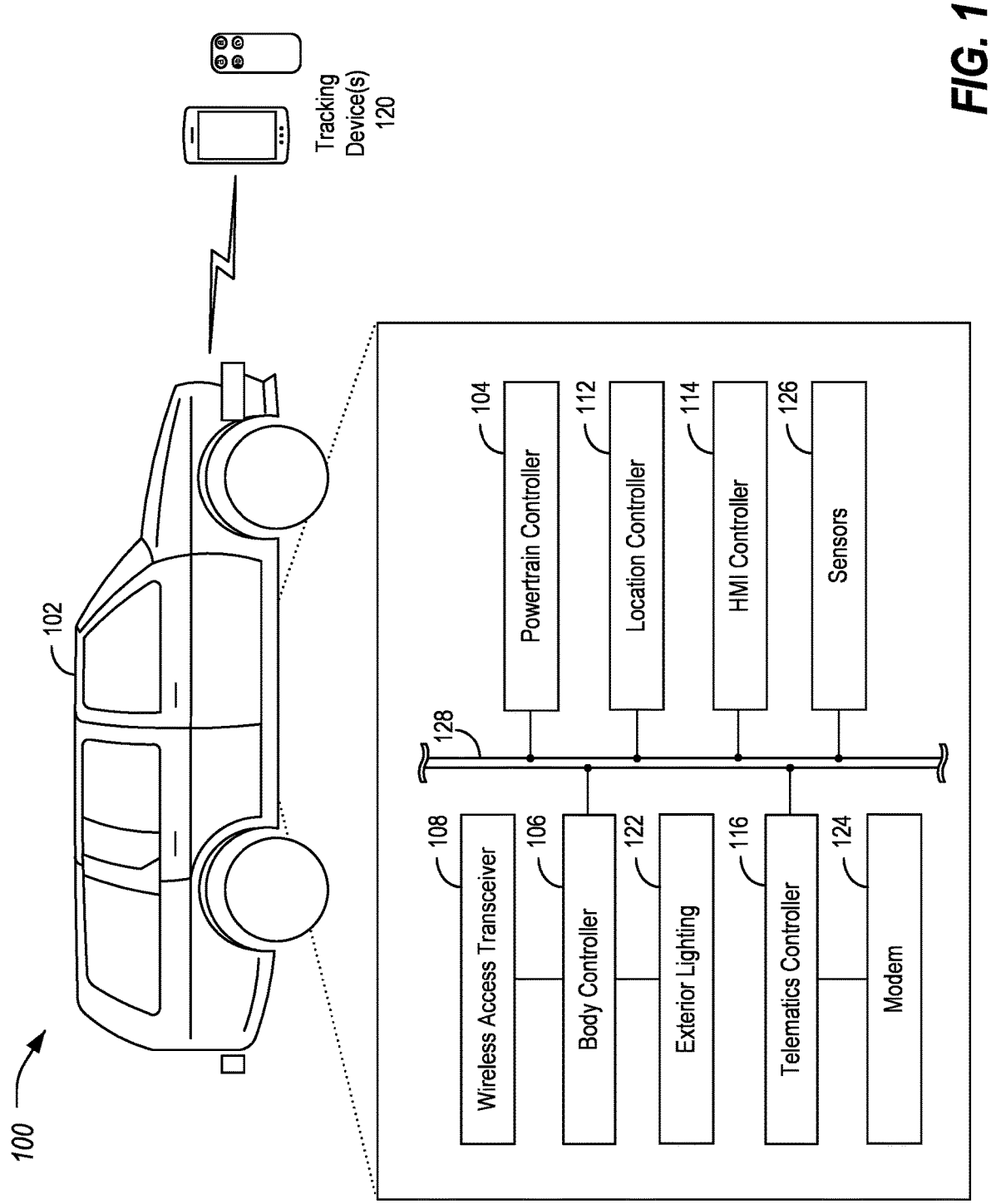
FIG. 1 illustrates an example system for performing collective zone lighting features.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Zone lighting features may enable illumination of the area around a vehicle. In an example, such features may allow people around the vehicle to be tracked, such that the lights of the vehicle may be aimed or activated to follow the people around the vehicle. Users may be tracked using wireless signal techniques such as monitoring of Bluetooth Low Energy (BLE) signal strength to a device carried by a user, and/or tracking of Ultra-Wideband (UWB) radio frequency round-trip time-of-flight (RF-ToF) between a user's device and the vehicle. Other tracking techniques for following may be used as well based on vehicle features, such as use of cameras, light detection and ranging (LiDAR), radio detection and ranging (RADAR), ultrasound, sound navigation and ranging (SONAR), etc.

Zone lighting features may be extended to multiple vehicle situations, where a group of vehicles may be collectively controlled to provide additional features both for work situations and recreation.

To begin utilizing multi-vehicle coordinated lighting features, a customer may link their vehicle to other vehicles. This may be accomplished, for example, using the touch screen and BLE/UWB functionality for communication with the other vehicles and/or with other users. The vehicles being linked may accept to be part of the group (e.g., as a work-crew, for a family outing, for a business gathering, for a club, etc.).

An exterior lighting level may then be selected for each vehicle of the group. For instance, the user may set all lights to be on (e.g., the lights including puddle, head, backup, curtain, bed, etc.). The user may set for lighting to be activated by movement within a specific distance from the vehicle. The user may also set a combination of static-ON or movement activated lighting.

Some vehicles may have aimable headlights. Also, some vehicles may be equipped with dynamic light emitting diode (LED) headlights that can shape the light output, and/or those with movable/aimed light. Some vehicles (e.g., police cruisers or off-road vehicles) may also have spotlights or other aftermarket lights that may be aimed electronically. Using such systems, a user may set a position on a screen map or desired area to be illuminated. The vehicles may individually select lights to illuminate this spot based on their orientation and capability. This may be used to allow the group of vehicles to collectively light an area such as a ski hill, a site for nighttime working (e.g., brick layers, road construction site, etc.), a sports event (e.g., a volleyball, soccer, or baseball field), or another outdoor gathering such as a party.

The group of vehicles may also collectively light the area surrounding a user. For example, a worker or sledder may carry a tracking device having a BLE or UWB transceiver, which may allow the vehicles to track the user's location. The vehicles may accordingly be able to direct the crowd-sourced lights on towards the tracked location of the user. This tracking device may be the user's phone in an example. In another example, the tracking device may be a fob or an active custom device. In yet a further example, the user may be tracked without a tracking device, such as via tracking techniques that use RADAR, SONAR, LiDAR, etc. sensors of the vehicle.

The intensity of the lighting may be collectively controlled to provide a specific intensity, to prevent the vehicles from over- or under-illuminating the user. For example, vehicles father away from the user may provide brighter illumination of the area than vehicles closer to the user. Or vehicles nearest to the user may shut off their lights to let other adjacent vehicles illuminate. Depending on the location to be illuminated (e.g., street, driveways, grass field, dirt lot, etc.), some vehicles may be on different inclines. As a user traverses in the Z-axis (either up or down), the vehicles with the corresponding up or down incline may be given primary duty to illuminate the target.

In some examples, other devices may be added to the group. In one example, portable lights may also be added to the group to allow fill lighting. The portable lamps may have wireless capabilities to become part of the vehicle group collective. In another example, a tethered drone may also provide fill light for positions the vehicles cannot reach. The drone light power and flight power may be provided via the tether. The drone may also utilize left-right, up-down direction capability or a swivel light to aid in aiming the lighting towards the target user or area.

FIG. 1 illustrates an example vehicle 102 for use in a system 100 providing collective zone lighting features. The vehicle 102 may include various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The vehicle 102 may include a plurality of controllers configured to perform and manage various vehicle 102 functions under the power of the vehicle battery and/or drivetrain. The controllers may include various types of computing devices in support of performance of the functions of the controllers described herein. In an example, the controllers may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C #, FORTRAN, PASCAL, VISUAL BASIC, PYTHON, JAVASCRIPT, PERL, etc. Further aspects of the computing devices are shown with respect to FIG. 10.

As depicted, the example vehicle controllers are represented as discrete controllers (e.g., a powertrain controller 104, a body controller 106, a location controller 112, a HMI controller 114, and a telematics controller 116). However, the vehicle controllers may share physical hardware, firmware, and/or software, such that the functionality from multiple controllers may be integrated into a single controller, and that the functionality of various such controllers may be distributed across a plurality of controllers.

The powertrain controller 104 may be configured to provide control of engine operating components (e.g., idle control components, fuel delivery components, emissions control components, etc.) and for monitoring status of such engine operating components (e.g., status of engine codes).

The body controller 106 may be configured to manage various power control functions such as exterior lighting 122, keyless entry, remote start, and point of access status verification (e.g., closure status of the hood, doors and/or trunk of the vehicle 102). The body controller 106 may be in communication with a wireless transceiver 108. The wireless transceiver 108 may be configured to facilitate communication with tracking devices 120 using wireless protocols such as BLE or UWB. The tracking devices 120 may include key fobs, mobile phones, or dedicated devices that are configured to communicate wirelessly with the wireless transceiver 108 to facilitate identification and location of a user. The wireless transceiver 108 may allow the body controller 106 to identify the locations of key fobs, mobile phones, or other devices that may identify users for access to the vehicle 102. In an example, the body controller 106 may unlock doors of the vehicle 102 responsive to detection of an approach of an authorized user via the wireless transceiver 108 (e.g., detected based on increased BLE signal strength or decreasing RF-ToF of the approaching tracking device 120).

The exterior lighting 122 may include various lights on the exterior of the vehicle 102. These may include, for example, headlights that shine forwards in front of the vehicle 102 (e.g., low and/or high beams), taillights that shine rearwards behind the vehicle 102, a center high mounted stop light (CHMSL), curtain lighting that shines to the sides of the vehicle 102, bed lights in the bed of a truck bed, and/or puddle lamps that shine downwards from under the side mirrors. Some vehicles 102 may have aimable headlights that can be steered into different directions. Also, some vehicles 102 may be equipped with dynamic LED headlights that can shape the light output. Some vehicles 102 (e.g., police cruisers or off road vehicles) may also have spotlights or other aftermarket lights that may be aimable or otherwise controllable. The exterior lighting 122 of the vehicle 102 may be adjusted in orientation and intensity by the body controller 106.

The location controller 112 may be configured to provide vehicle location information. For example, the location controller 112 may allow the vehicle 102 to receive time and location information from a global navigation satellite system (GNSS) constellation of satellites.

The HMI controller 114 may be configured to receive user input via various buttons or other controls, as well as provide vehicle status information to a driver, such as fuel level information, engine operating temperature information, and current location of the vehicle 102. The HMI controller 114 may be configured to provide information to various displays within the vehicle 102, such as a center stack touchscreen, a gauge cluster screen, etc.

The telematics controller 116, sometimes referred to as a telematics control unit (TCU), may include network hardware configured to facilitate communication between the other vehicle controllers 104-114 and with other devices of the system 100. The telematics controller 116 may include or otherwise access a modem 124 configured to facilitate communication with other vehicles 102 or with infrastructure. The modem 124 may, additionally, be configured to communicate over a broadcast peer-to-peer protocol (such as PC5), to facilitate C-V2X communications with devices such as other vehicles 102. The telematics controller 116 may be further configured to communicate over various other protocols, such as with a communication network over a network protocol (such as Uu). It should be noted that these protocols are merely examples, and different peer-to-peer and/or cellular technologies may be used.

The controllers 104-116 of the vehicle 102 may make use of various sensors 126 in order to receive information with respect to the surroundings of the vehicle 102. In an example, these sensors 126 may include one or more of cameras (e.g., advanced driver assistance system (ADAS) cameras), ultrasonic sensors, radar systems, and/or lidar systems. The sensors 126 may be used to allow the vehicle 102 to image its surroundings. For instance, camera sensors 126 mounted on the front, rear, and sides of the vehicle 102 may be used to capture visual images of the surroundings of the vehicle 102. An image coordinate transformation (e.g., via a homogeneous transform matrix) may be performed on the images by the controllers to generate a top-down view of the surroundings, in an example.

A vehicle bus 128 may include various methods of communication available between the vehicle controllers 104-116. As some non-limiting examples, the vehicle bus 128 may include one or more of a vehicle controller area network (CAN), an Ethernet network, and a media-oriented system transfer (MOST) network. While a single vehicle bus 128 is illustrated, it should be noted that in many examples, multiple vehicle buses 128 are included, with a subset of the controllers 104-116 connected to each vehicle bus 128.

Figure 2:
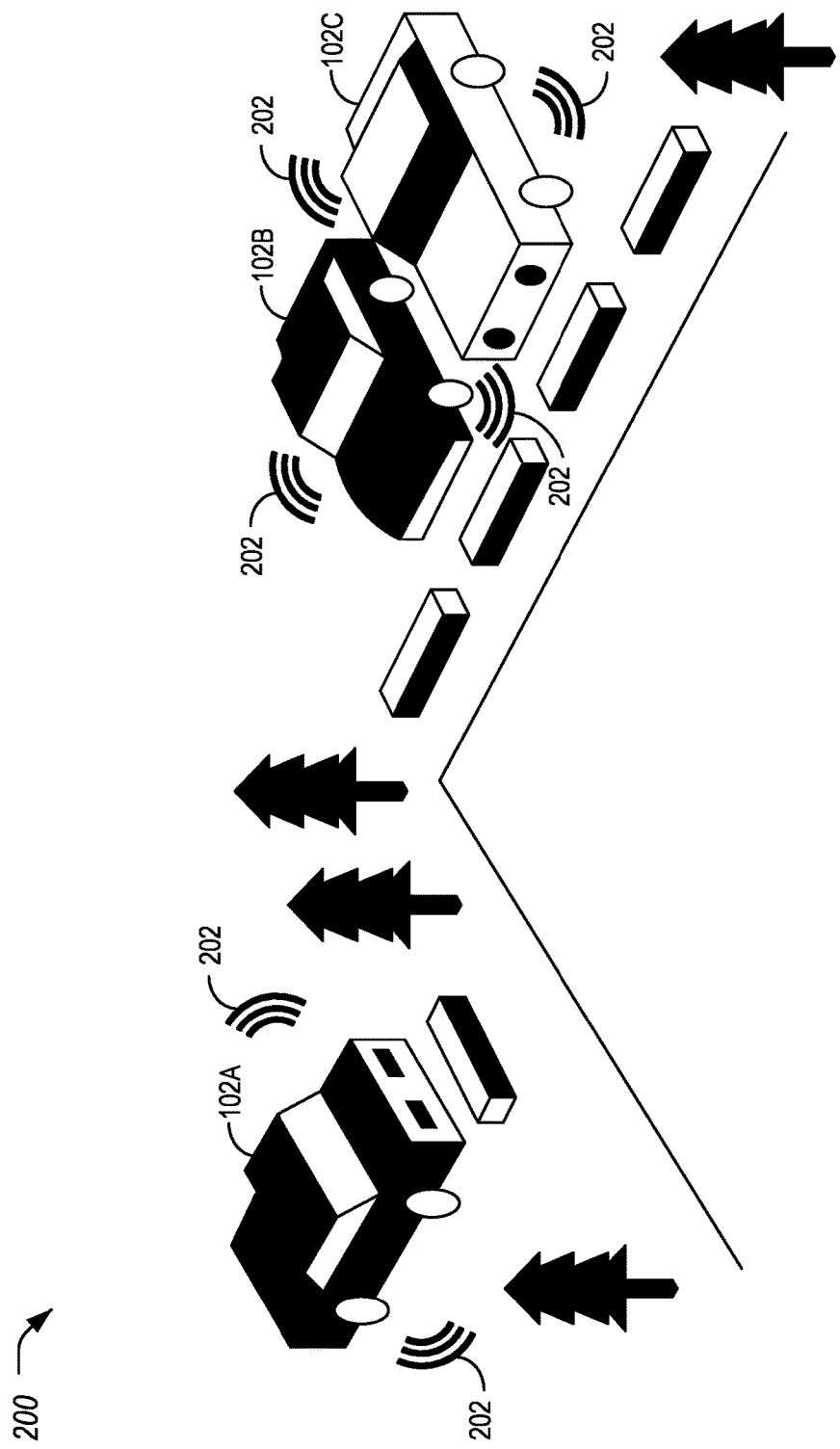
FIG. 2 illustrates an example group of vehicles in an area.

FIG. 2 illustrates an example group of vehicles 102 in an area 200. As shown, the area 200 includes three vehicles 102: vehicle 102A, vehicle 102B, and vehicle 102C. Each of the vehicles 102A-C is parked facing a clearing. Vehicle 102A is facing one side of the area 200, while vehicles 102B and 102C are facing the same general spot from another side. Each of the vehicles 102 may use its respective location controller 112 to identify its location. The location controllers 112 of the vehicles 102 may also use GNSS and/or a compass to determine vehicle 102 orientation.

The vehicles 102 may use their wireless communications features to communicate with one another. In an example, wireless messages 202 may be sent between the vehicles 102 using wireless protocols such as BLE or UWB via the wireless transceiver 108. For instance, the vehicles 102 may communicate their locations to one another via the wireless messages 202. The wireless messages 202 may also include other information about the vehicles 102. For instance, information regarding the appearance of the vehicles 102, such as color, model, user name, etc., may be included in the wireless messages 202. In an example, the vehicles 102 may periodically broadcast the wireless messages 202. In another example, a lead vehicle 102 may broadcast a wireless message 202 that, if received by other vehicles 102, causes the other vehicles 102 to provide their locations to the lead vehicle 102 in response wireless messages 202.

Figure 3:
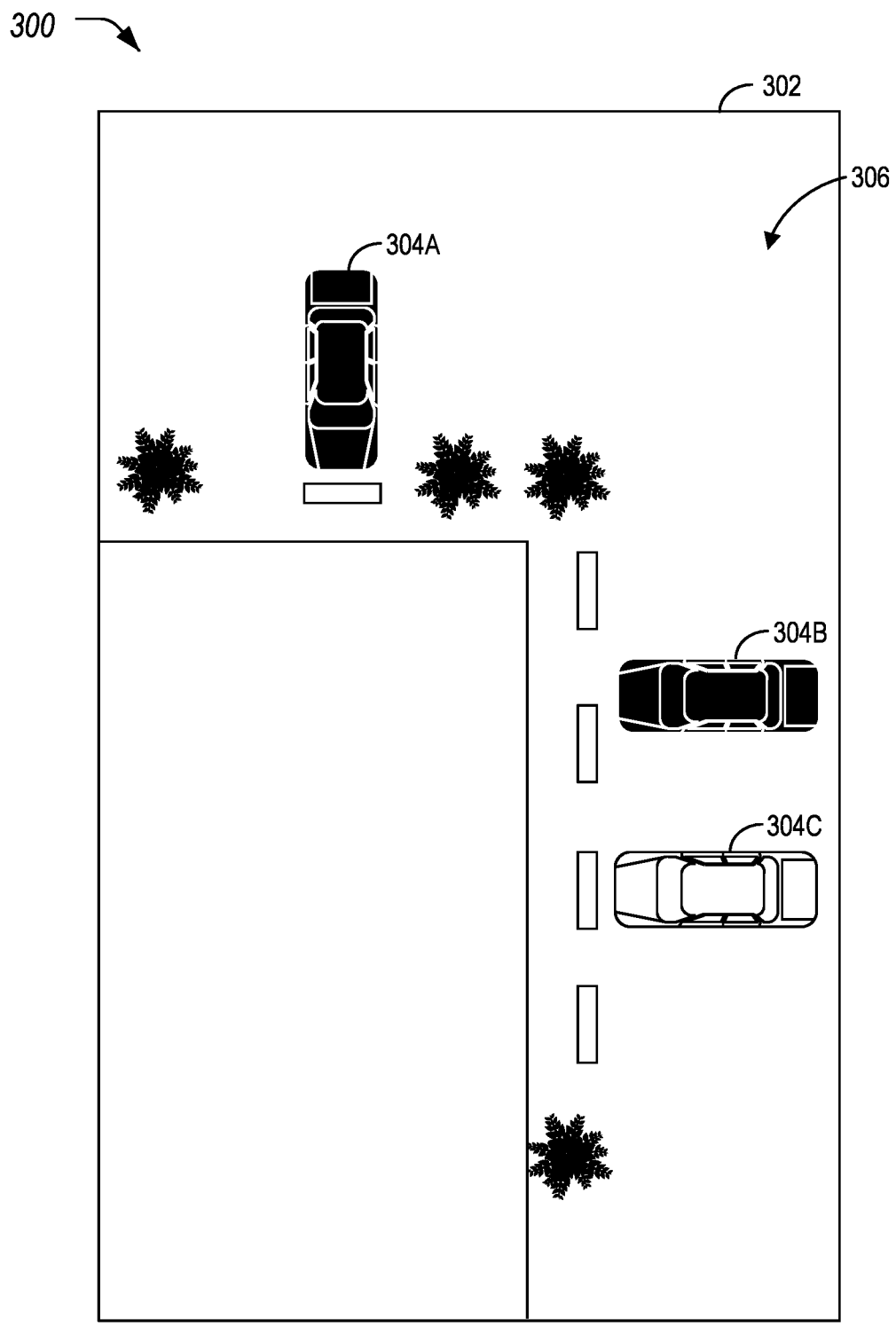
FIG. 3 illustrates an example of an HMI illustrating a map of the vehicle positions relative to one another.

FIG. 3 illustrates an example 300 of an HMI 302 illustrating vehicle indications 304 of the vehicles 102 relative to one another on a map 306. In an example, the HMI 302 may be displayed via a screen controlled by the HMI controller 114 of one of the vehicles 102. In another example, the HMI 302 may be displayed via a screen of a mobile phone used as a tracking device 120 of one of the vehicles 102.

As shown, vehicle indications 302A-C of the vehicles 102A-C are illustrated in a top-down view consistent with their actual locations and orientations of the vehicles 102A-C shown in FIG. 2. The vehicle indications 302A-C may further be shown consistent with attributes of the respective vehicles 102, such as the same color, same model, etc.

The map 306 may include information to provide context to the user. In an example, the map 306 data may include predefined image tiles stored to the vehicle 102 or received by the vehicle 102 from a cloud mapping service. In another example, the maps 306 may include real-time image data collected by the sensors 126 of the vehicles 102A-C. For instance, the vehicles 102 may use their camera sensors 126 to capture visual images of their surroundings, which may be wirelessly shared among the vehicles 102 and used to instead of or in addition to the predefined image times to augment the maps 306 with live information.

Figure 4:
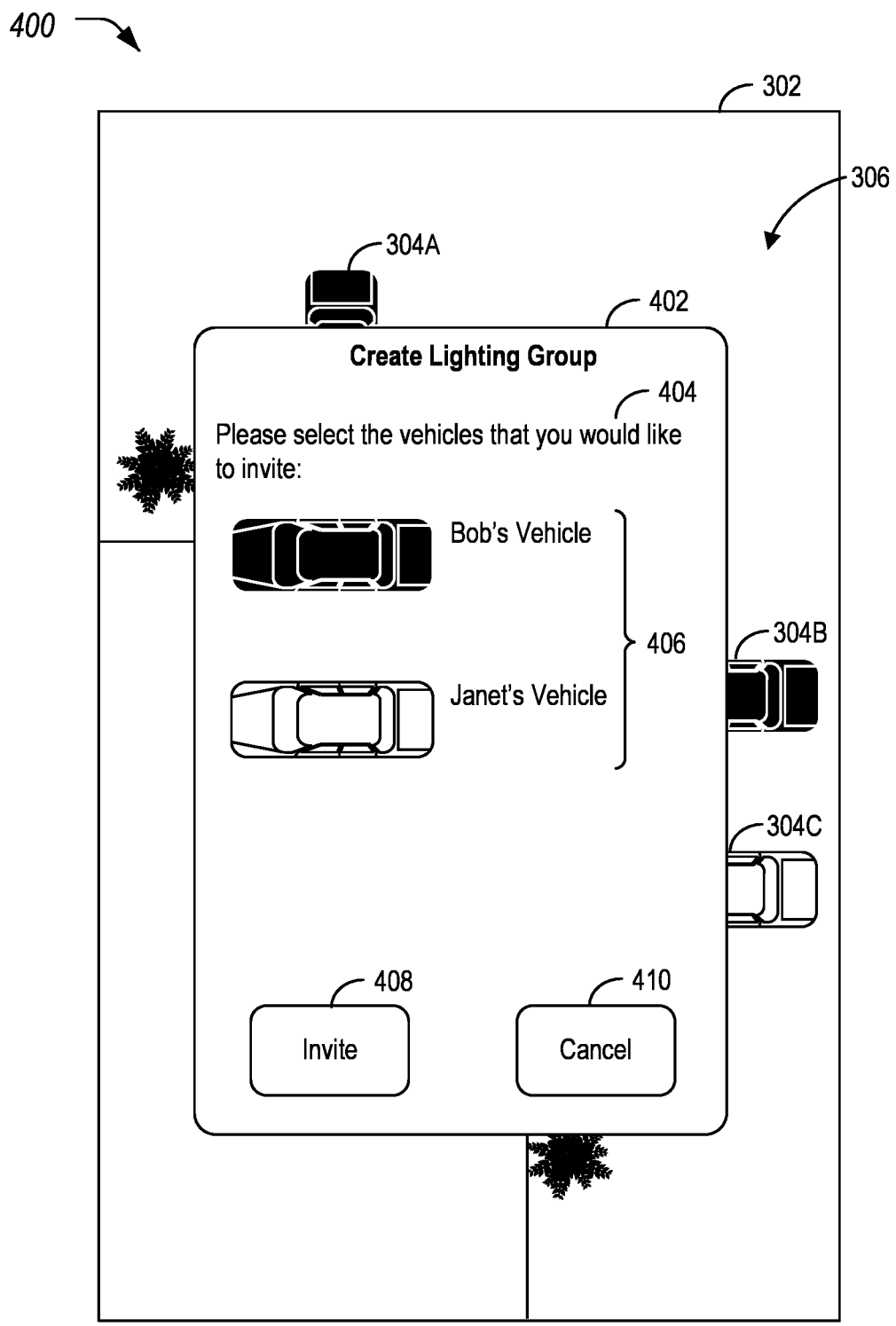
FIG. 4 illustrates an example of the HMI showing the sending of an initiation to join a lighting group.

FIG. 4 illustrates an example 400 of the HMI 302 showing the sending of an initiation to join a lighting group. In general, the vehicles 102 may be configured to advertise their willingness to create or join a group of vehicles 102 to be collectively controlled to provide coordinated lighting features. In an example, one of the vehicles 102 may be configured to be an organizer vehicle 102 and may transmit a create group message to be received by other vehicles 102 within range of the organizer vehicle 102.

For instance, a user of the vehicle 102A may select from the HMI 302 to invite other vehicles 102 to create the lighting group. This may result in the display of a lighting group invite dialog 402. The lighting group invite dialog 402 may include a description 404 informing the user of the vehicle 102A to select from a vehicle list 406 of the detected vehicles 102 (here vehicles 102B and 102C). Once the user has selected the vehicles 102 to invite, the user may select an invite control 408 to cause the vehicle 102A to send invitations to join the lighting group. Or, if the user elects not to proceed, the user may select a cancel control 410 to dismiss the lighting group invite dialog 402 without sending invites. In another example, the invite may be broadcast to all vehicles 102 within listening range of the inviting vehicle 102, without the user making a selection.

Figure 5:
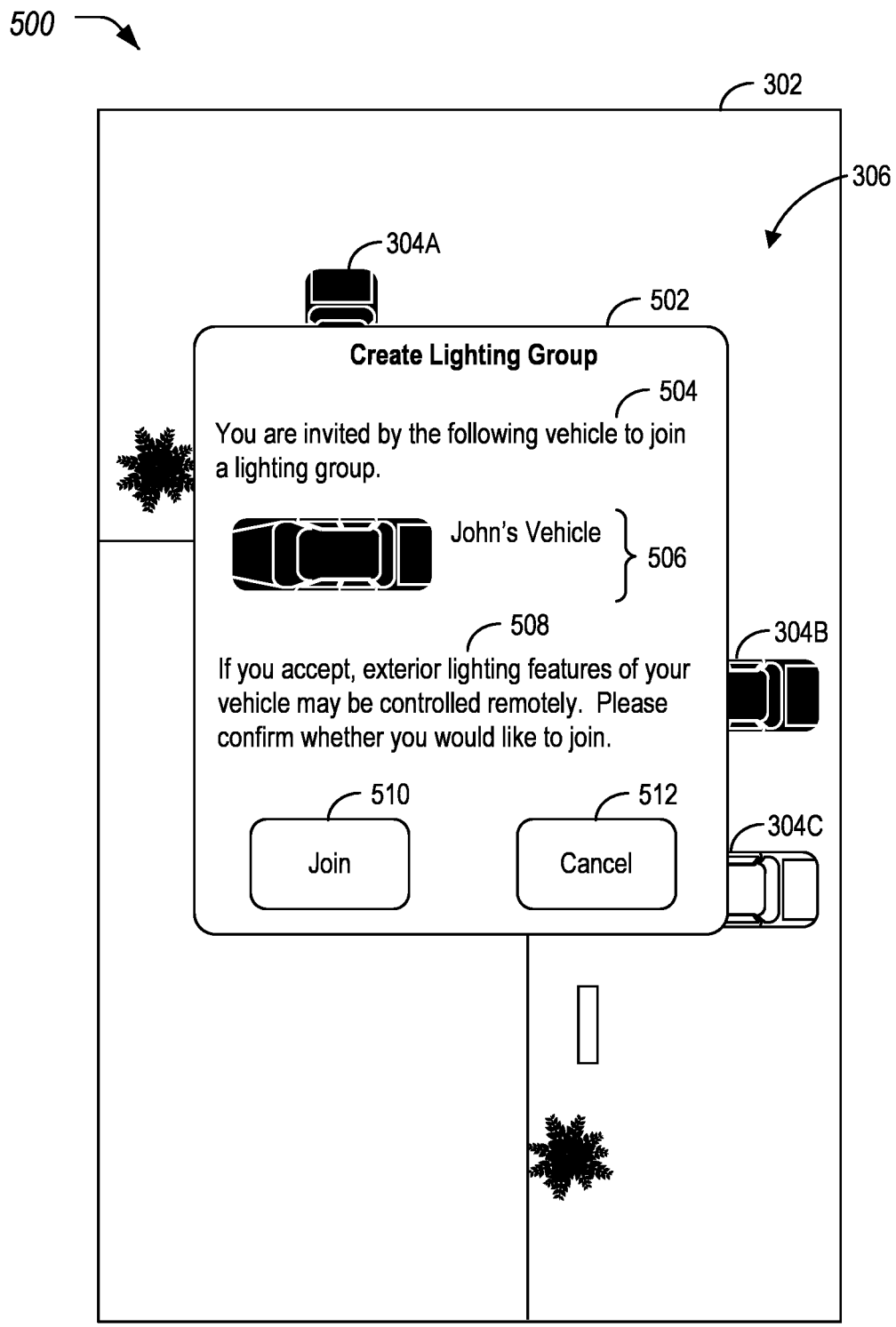
FIG. 5 illustrates an example of the HMI showing the receiving of an invitation to join the lighting group.

FIG. 5 illustrates an example 500 of the HMI 302 showing the receiving of an invitation 502 to join the lighting group. The invitation 502 may be received wirelessly by the invited vehicles 102B and 102C. In an example, the HMI 302 may be displayed via a screen controlled by the HMI controller 114 of one of the recipient vehicles 102. In another example, the HMI 302 may be displayed via a screen of a mobile phone used as a tracking device 120 of one of the recipient vehicles 102.

The invitation 502 may include a description 504 informing the user that the vehicle 102 is invited to join a lighting group. The invitation 502 may also illustrate sender information 508 about the inviting vehicle 102 (here, vehicle 102A). The sender information 508 may include information such as a name of the inviting vehicle 102, the color of inviting vehicle 102, the make of the inviting vehicle 102, etc. The invitation 502 may also include an explanation 510 that accepting the invitation 502 may result in the exterior lighting 122 features of the vehicle 102 being controlled remotely and asking the user to confirm. The user may select a join control 512 to cause the vehicle 102B or 102C to accept the invitation 502 to join the lighting group. The user may select a decline control 514 to cause the recipient vehicle 102B or 102C to elect not to join the lighting group. If at least one potential joined vehicle 102 responds with an acceptance, the organizer vehicle 102 may take a leadership role for controlling the light features.

As a variation, a potential joined vehicle 102 may also send a request to join the group in another example, by selecting from a listing of available lighting groups, where the request may be sent to the leader vehicle 102, or any vehicle 102 of the lighting group to be accepted or declined.

Figure 6:
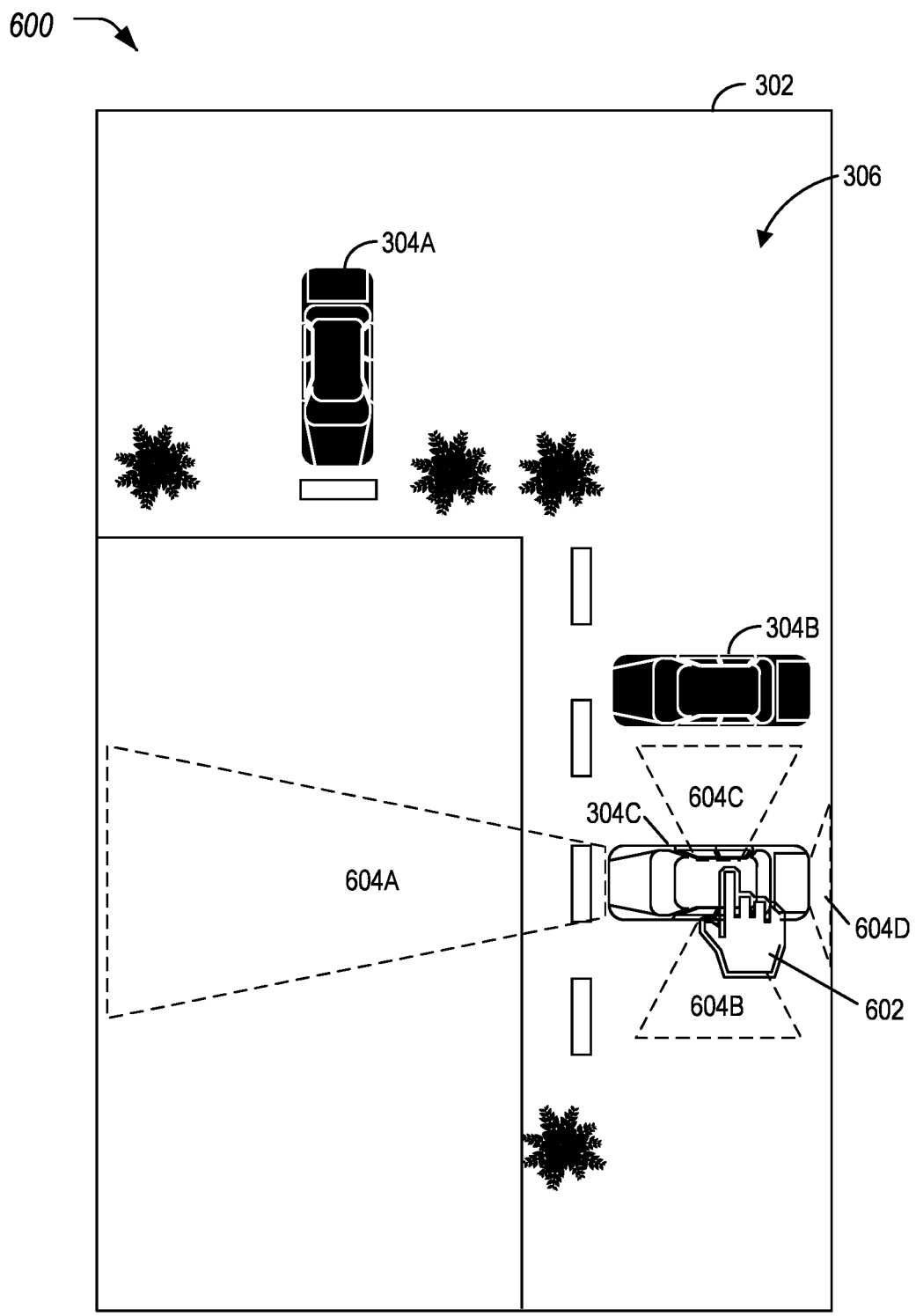
FIG. 6 illustrates an example of the activation of the exterior lighting of one of the vehicles of the lighting group.

FIG. 6 illustrates an example 600 of the activation of the exterior lighting 122 of one of the vehicles 102 of the lighting group. As shown, the user may select the vehicle indication 302C to activate the exterior lighting 122 of that specific vehicle 102C. For instance, as shown by the hand indication 602, the user may touch the vehicle indication 302C to activate the exterior lighting 122 of the vehicle 102C. This may result in the providing of illumination areas 604A-D (collectively illumination areas 604) around the vehicle 102C. These may include, for example, the illumination area 604A provided in front of the vehicle 102C using the headlights, the illumination area 604B provided along the drivers side of the vehicle 102C via curtain lighting and/or puddle lamps, the illumination area 604C provided along the passenger side of the vehicle 102C via curtain lighting and/or puddle lamps, and the illumination area 604D provided behind the vehicle 102C via backup lighting and/or the CHMSL.

In many examples, the HMI 302 may overlay indications on the map 306 to illustrate simulated operation of the exterior lighting 122. As another possibility, the vehicles 102 may utilize their sensors to capture actual imagery surrounding the vehicle 102, which may be transformed into a bird's-eye view and displayed to illustrate the actual effect of the exterior lighting 122.

Figure 7:
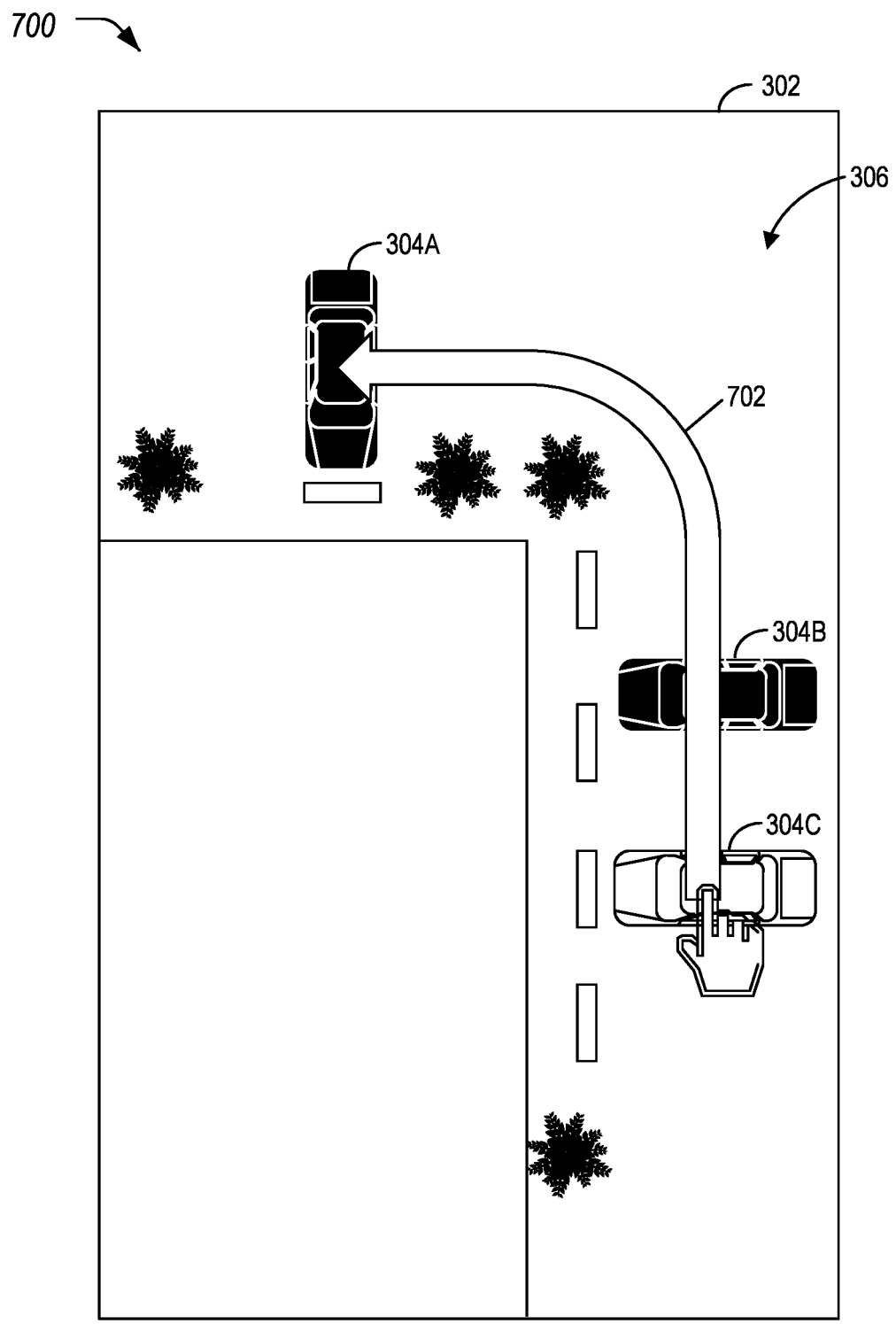
FIG. 7 illustrates an example of the selection of a plurality of vehicles from the group.

In many cases, however, it may be desirable to perform collective lighting actions using the exterior lighting 122 of more than one vehicle 102. FIG. 7 illustrates an example 700 of the selection of a plurality of vehicles 102 from the group. As shown, the user may select vehicle indications 302A-C to select to perform a collective lighting action using that collection of vehicles 102. For instance, as shown by gesture 702, the user may perform a swipe action to select each of the vehicle indications 302A-C. It should be noted that in other examples, as compared to the selections shown in FIGS. 6-7, the default may be for the collective lighting action to be performed using all of the vehicles 102 of the lighting group.

Figure 8:
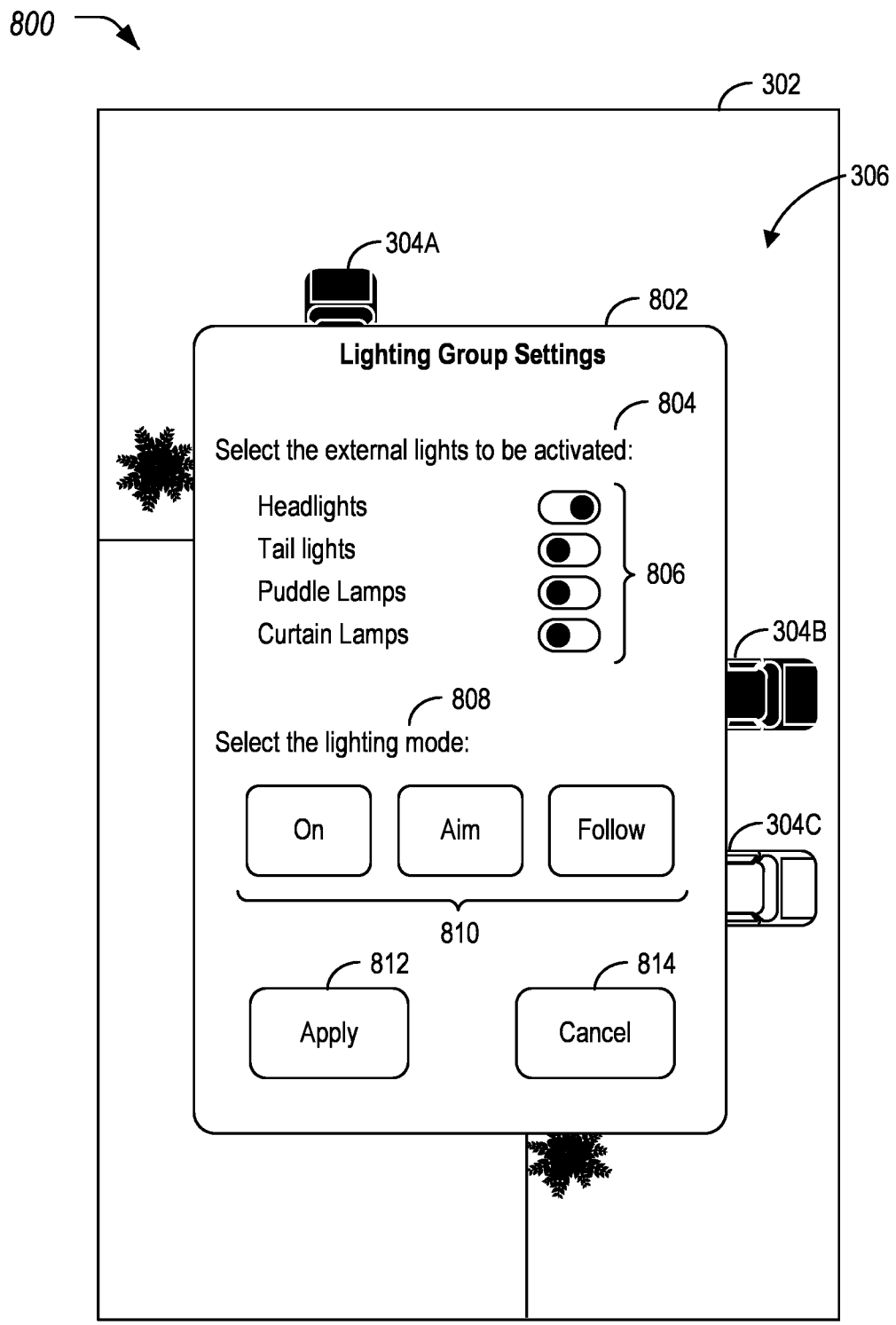
FIG. 8 illustrates an example of using the HMI to control collective lighting actions.

FIG. 8 illustrates an example 800 of using the HMI 302 to control collective lighting actions. As shown, the HMI 302 provides a lighting group configuration dialog 802 including a listing of options that may allow the group of vehicles 102 to be controlled. In an example, the lighting group configuration dialog 802 may be displayed responsive to creation of the group. In another example, the lighting group configuration dialog 802 may be displayed responsive to the user selecting to configure (or reconfigure) the operation of the lighting group.

The lighting group configuration dialog 802 may allow the user to select from the various available exterior lighting 122. As shown, the lighting group configuration dialog 802 includes an available lights label 804 explaining that the user may select from a listing of available exterior lighting types 806. This available exterior lighting types 806 shows the options of headlights, tail lights, puddle lamps, and curtain lamps. It should be noted that these are examples, and more, different, or other types of exterior lighting 122 may also be listed, if available. For instance, if accessory light racks or spotlights are indicated in the wireless messages 202 as being available then these may also be included. Or if supplemental fill lighting devices are located in the wireless messages 202 these may be listed as well.

The lighting group configuration dialog 802 may also allow the user to select from various collective lightings actions to be performed by the vehicles 102 in the group using the available exterior lighting types 806 that are selected. As shown, the lighting group configuration dialog 802 includes a lighting mode label 808 explaining that the user may select from a listing of available exterior lighting modes 810. As shown, the available exterior lighting modes 810 include the selected lights being turned on in their default orientation, the selected lights being aimable to a specific location, or the lights being configured to illuminate the area (or areas) surrounding tracked users, e.g., tracked using the tracking devices 120, tracked using sensors 126 of the vehicle 102, etc.

The user may select to use the lighting settings by pressing an apply button 812. The user may discard the settings and revert to the previous settings by pressing a cancel button 814. It should be noted that the options of the lighting group configuration dialog 802 are illustrative, and more, fewer, or different options may be available. For example, the options may include a mode to flash the lights in time according to audio that is being played back (or audio that is being picked up by a microphone). Or, the options may include to provide dancing, chaser, or other lighting effects without regard to sound.

Figure 9:
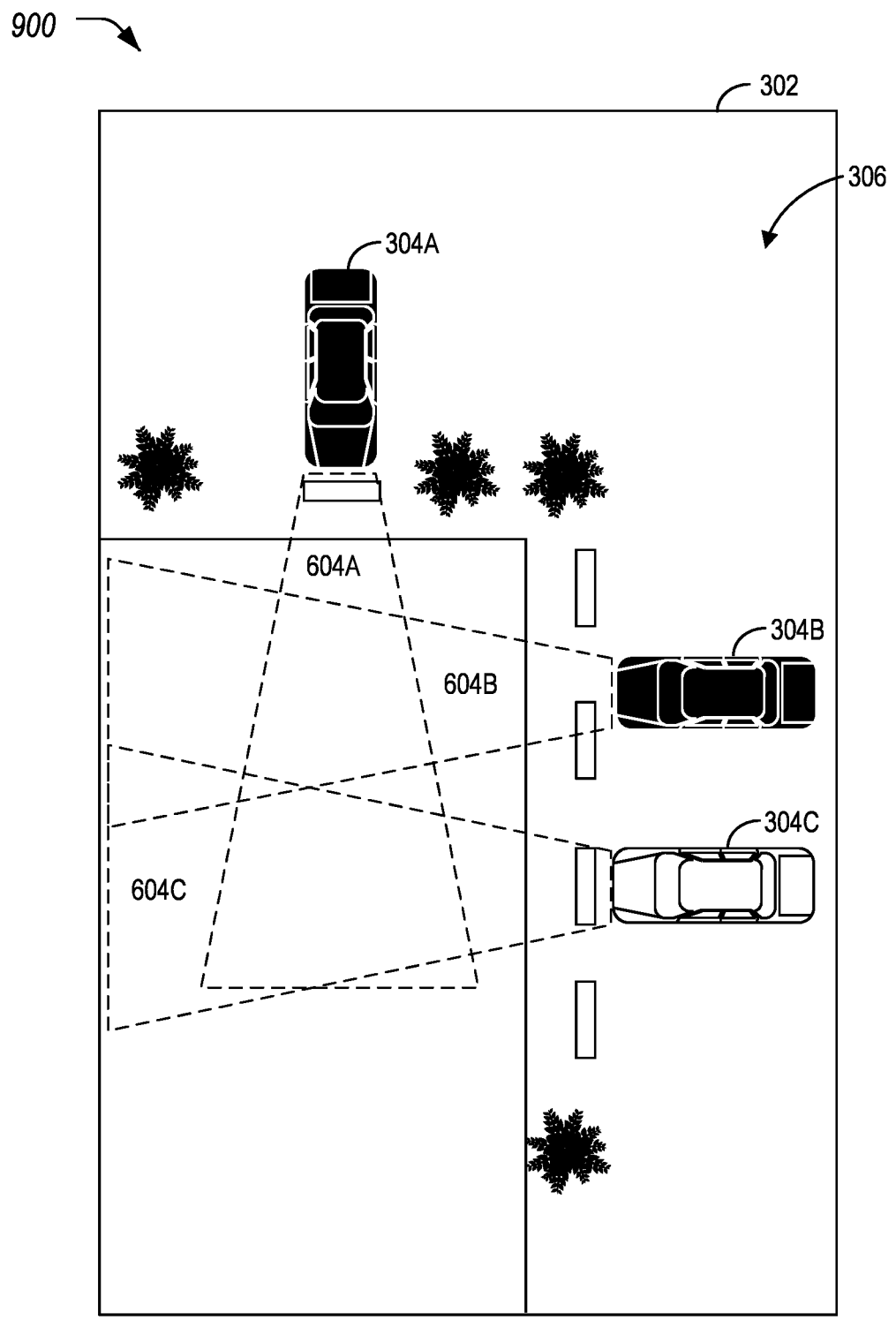
FIG. 9 illustrates an example of the HMI illustrating the operation of the lighting group in the on mode.

FIG. 9 illustrates an example 900 of the HMI 302 illustrating the operation of the lighting group in the on mode. As shown, the headlights of each of the vehicle 102 of the lighting group are engaged. This was selected via the lighting group configuration dialog 802 shown FIG. 8. The HMI 302 may further illustrate the illumination areas 604 resulting from the selection. As shown, the vehicle indication 302A displayed as providing illumination area 604A, the vehicle indication 302B is displayed as providing illumination area 604B, and the vehicle indication 302B is displayed as providing illumination area 604B.

In many examples, the HMI 302 may overlay indications on the map 306 to illustrate simulated operation of the exterior lighting 122. As another possibility, the vehicles 102 may utilize their sensors to capture actual imagery surrounding the vehicle 102, which may be transformed into a bird's-eye view and shared to the controlling vehicle 102 to allow for the display of the actual effect of the exterior lighting 122.

Figure 10:
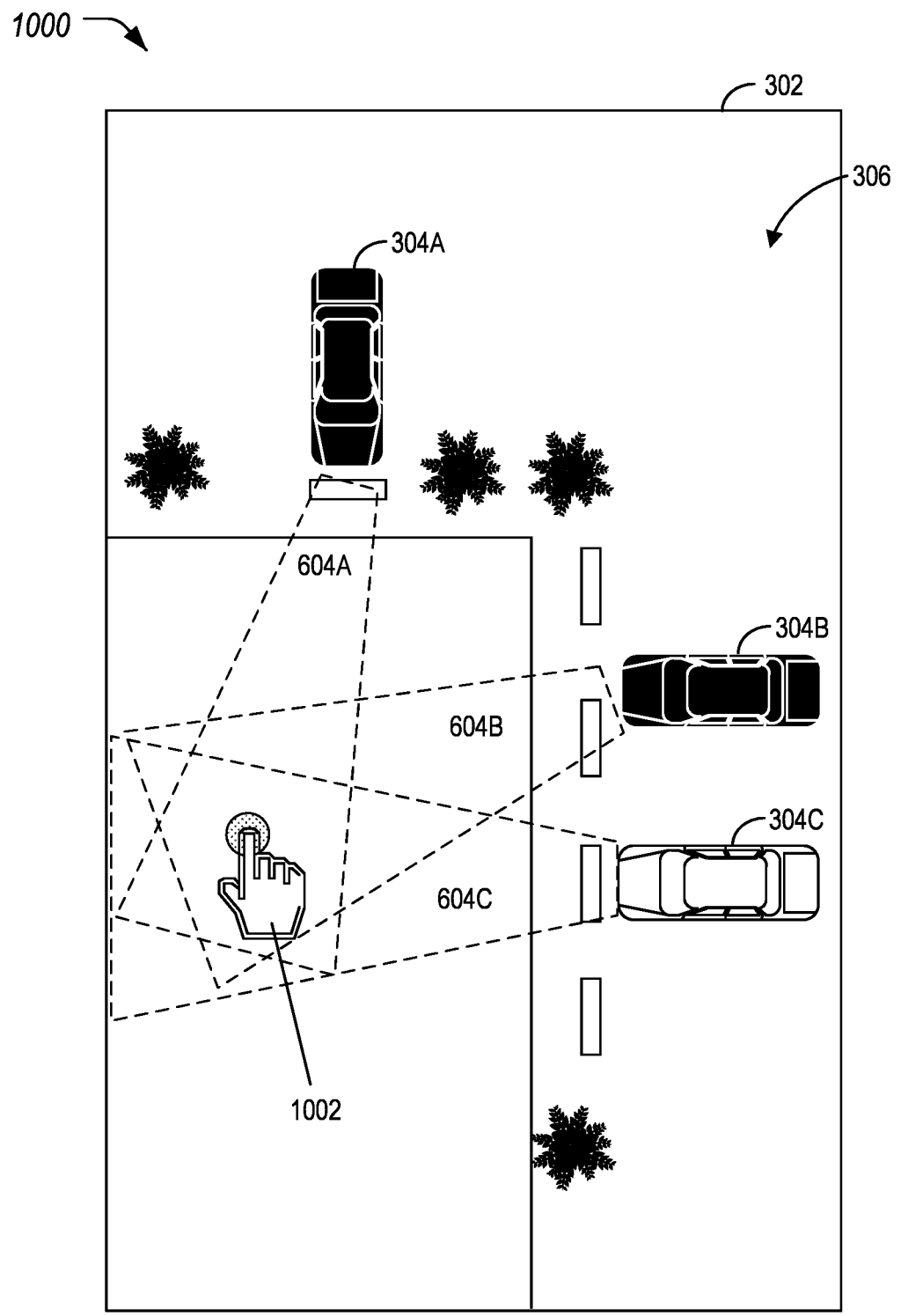
FIG. 10 illustrates an example of the HMI illustrating the operation of the lighting group in the aim mode.

FIG. 10 illustrates an example 1000 of the HMI 302 illustrating the operation of the lighting group in the aim mode. As shown, the user may select a location on the map 306 to aim the exterior lighting 122 to that specific location. For instance, as shown by hand indication 1002, the user touches a location within range of the headlight exterior lighting 122 of each of the vehicles 102 to aim the exterior lighting 122 of all of the vehicles 102 of the group to that location. In the example, this may result in the providing of illumination areas 604 from each of the vehicles 102 to the selected location. As shown the headlights of the vehicle 102A are aimed to the passenger side and the headlights of the vehicle 102B are aimed to the driver side to reach the selected location. The headlights of the vehicle 102C reach the location at a relatively straight ahead angle. By using the aim mode, the user may be able to collectively illuminate the location using the group of vehicles 102.

Figure 11:
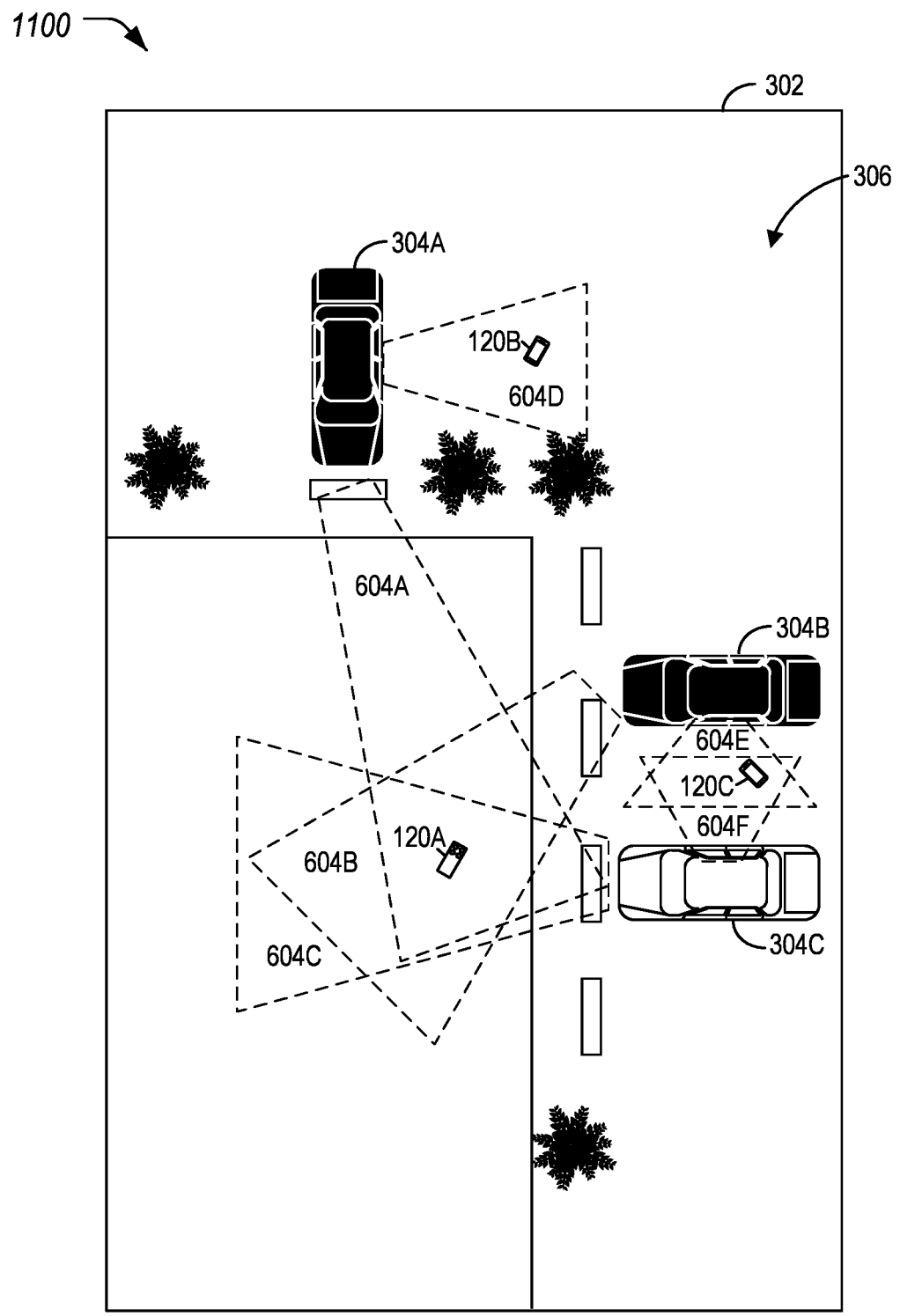
FIG. 11 illustrates an example of the HMI illustrating the operation of the lighting group in the follow mode.

FIG. 11 illustrates an example 1100 of the HMI 302 illustrating the operation of the lighting group in the follow mode. As compared to the aim mode in which the user selects the location on the map 306, in the follow mode the targeted locations for illumination are determined based on tracking of the users via the tracking devices 120 and/or via the sensors 126 of the vehicle 102.

The vehicles 102 may track the locations of the tracking devices 120 based on wireless signals received from the tracking devices 120. Based on the positions of the tracking devices 120, the vehicles 102 may determine which, if any, of the exterior lighting 122 has range to cover the locations of the tracking devices 120. If the vehicle 102 has suitable exterior lighting 122, then that exterior lighting 122 may be engaged and/or aimed to provide light to the location of the tracking device 120. If the vehicle 102 lacks suitable exterior lighting 122, then the vehicle 102 may consider the tracking device 120 to be out of range and may not provide illumination. As shown, a tracking device 120A is within range of the exterior lightings 122 of each of vehicles 102A-102C. Thus, the tracking device 120A is being illuminated by illumination area 604A from vehicle 102A, by illumination area 604B from vehicle 102B, and by illumination area 604C from vehicle 102C.

Also, a tracking device 120B is being illuminated by illumination area 604D from vehicle 102A, but here from a curtain light as that light is closest to the tracking device 120B. The other vehicles 102B-C are not also illuminating the tracking device 120B as they lack exterior lighting 122 within range of the tracking device 120B.

Additionally, a tracking device 120C is between vehicles 102B-102C. This tracking device 120C is illuminated by illumination area 604E from the curtain lighting of vehicle 102B and also by illumination area 604F from the curtain lighting of vehicle 102C.

In another example, the vehicles 102 may track the users without reliance on the tracking devices 120. For instance, the vehicles 102 may utilize RADAR, SONAR, and/or LiDAR sensors 126 of the vehicle 102 to identify movement around the vehicles 102. The locations of this movement may be used as the locations of the users to be tracked. For instance, if the vehicles 102 are a fleet of ships, then SONAR may be used to track other boats for illumination. Or, if the intended users to illuminate are planes or drones, then RADAR or LiDAR may be used to track those airborne vehicles 102 for illumination. It should be noted that these techniques are not limited to specific types of vehicle 102, and SONAR, RADAR, LiDAR, etc. may be used for tracking by any of various types of vehicles 102.

Figure 12:
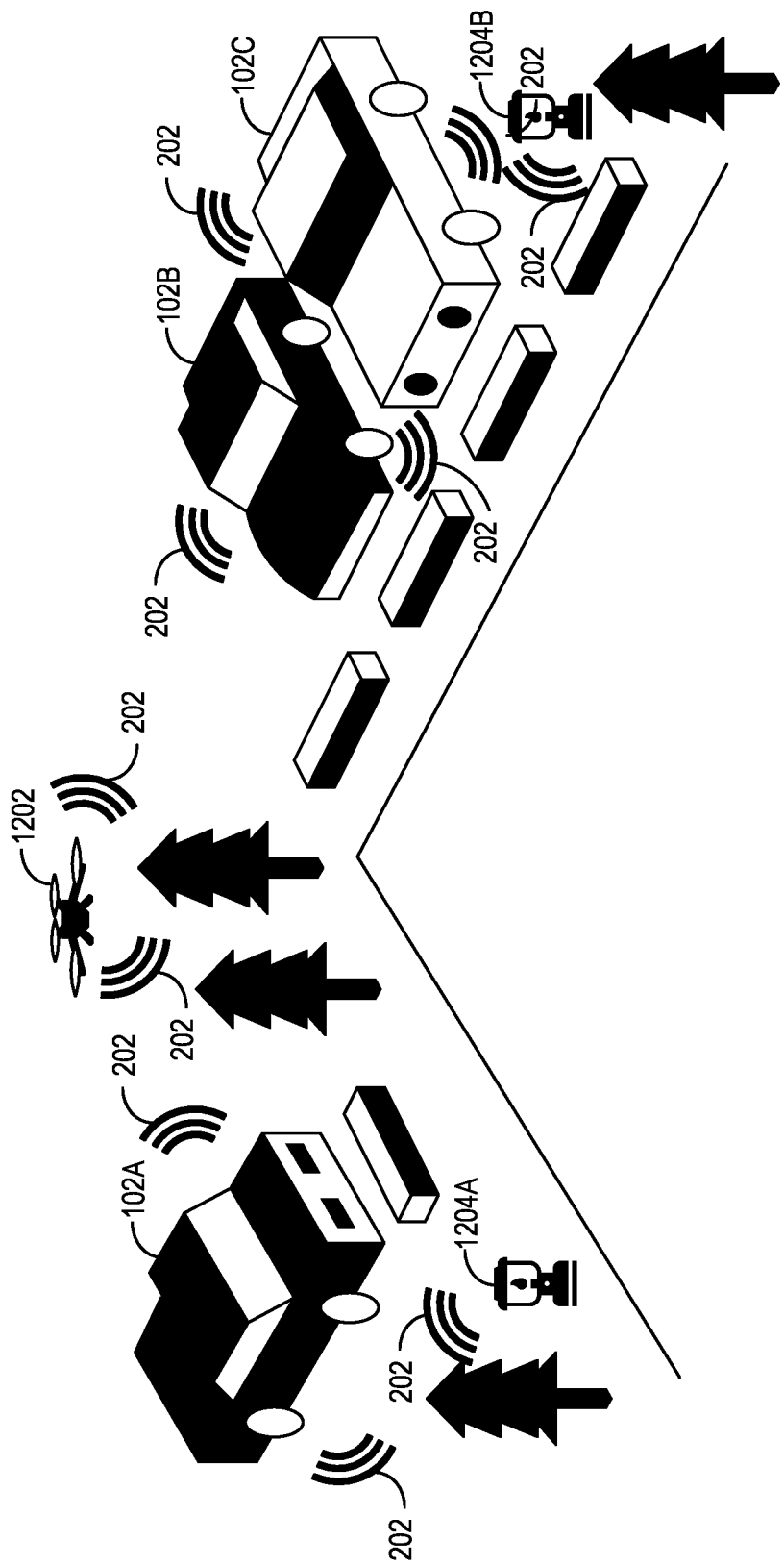
FIG. 12 illustrates an alternate example group of vehicles in the area including additional devices to provide fill lighting.

FIG. 12 illustrates an alternate example group of vehicles 102 in the area 200 including additional devices to provide fill lighting. As shown, the area 200 includes three vehicles 102: vehicle 102A, vehicle 102B, and vehicle 102C. However, in this example a drone 1202 is also available to be added to the group. Additionally, two portable lanterns 1204A, 1204B (collectively lanterns 1204) are also available for control. As with the vehicles 102, the drones 1202 and lanterns 1204 may be wirelessly controlled (e.g., via BLE, UWB, Wi-Fi, etc.). For instance, these additional devices may also communicate their locations and receive instructions via the wireless messages 202.

Figure 13:
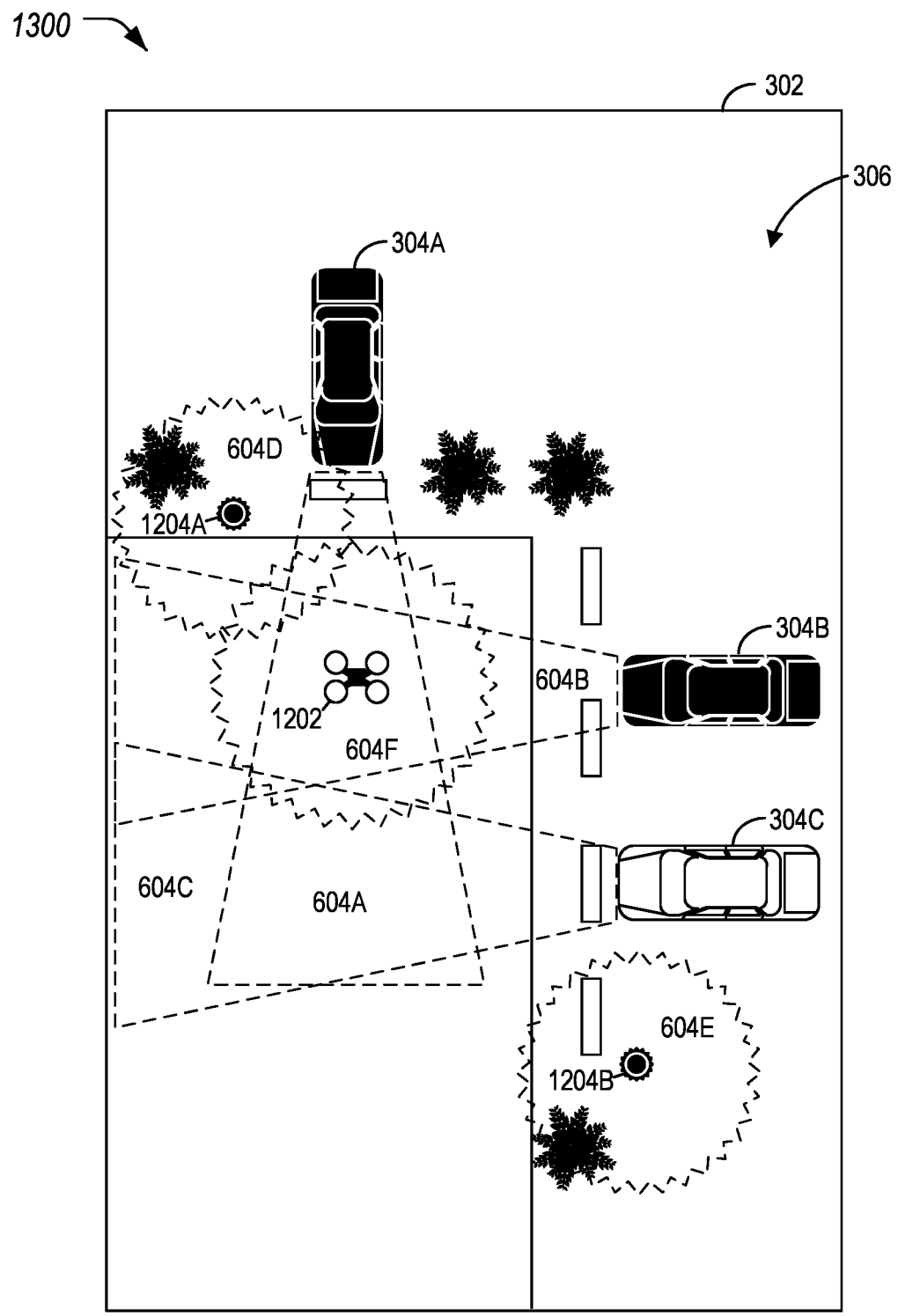
FIG. 13 illustrates the alternate example group of vehicles including the additional devices in the HMI.

FIG. 13 illustrates the alternate example group of vehicles 102 including the additional devices in the HMI 302. Similar to the control of the vehicles 102, the drone 1202 and lanterns 1204 may also be used to provide illumination areas 604. As shown, the vehicle indication 302A displayed as providing illumination area 604A, the vehicle indication 302B is displayed as providing illumination area 604B, and the vehicle indication 302B is displayed as providing illumination area 604B. Additionally, a drone indication 1302 corresponding to the drone 1202 is shown as providing illumination area 604D, a lantern indication 1304A corresponding to the lantern 1204A is shown as providing illumination area 604E, and a lantern indication 1304B corresponding to the lantern 1204B is shown as providing illumination area 604F.

It should be noted that the lanterns 1204 may have different functionality as compared to the vehicles 102. In an example, while some lanterns 1204 may provide aiming, in other examples the lanterns 1204 may lack aiming capabilities and may simply allow for intensity control. In another example, the drone 1202 may allow for movement, such that the drone 1202 may move to follow a tracking device 120, as opposed to aiming its lights while remaining at a fixed location.

Figure 14:
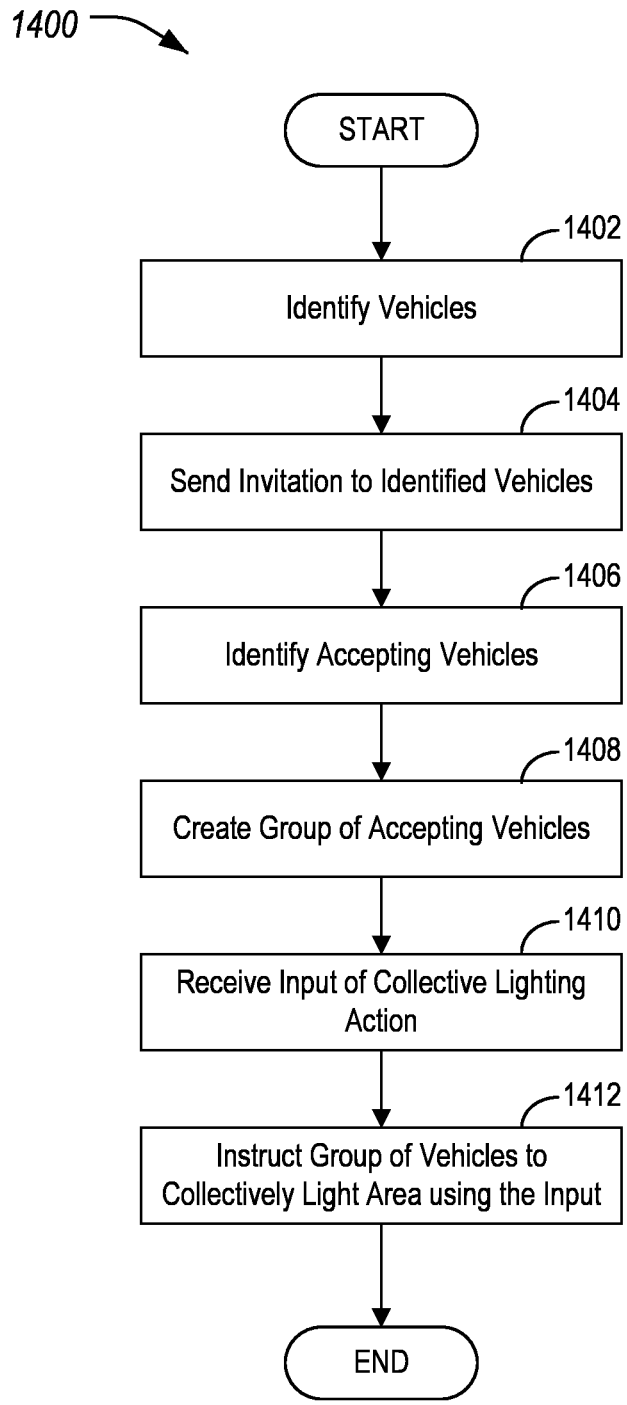
FIG. 14 illustrates an example process for the creation and control of a lighting group.

FIG. 14 illustrates an example process 1400 for the creation and control of a lighting group. In an example, the process 1400 may be performed by one or more controllers 104-116 of one of the plurality of vehicles 102 in the context of the system 100 discussed herein.

At operation 1402, the vehicle 102 identifies one or more other vehicles 102 available for a lighting group. In an example, the vehicle 102 utilizes the wireless transceiver 108 to identify the one or more other vehicles 102. For instance, wireless messages 202 may be sent between the vehicles 102 using wireless protocols such as BLE or UWB via the wireless transceiver 108. The vehicles 102 may communicate their locations to one another via the wireless messages 202. The wireless messages 202 may also include other information about the vehicles 102. For instance, information regarding the appearance of the vehicles 102, such as color, model, user name, etc., may be included in the wireless messages 202. In an example, the vehicles 102 may periodically broadcast the wireless messages 202. In another example, a lead vehicle 102 may broadcast a wireless message 202 that, if received by other vehicles 102, causes the other vehicles 102 to provide their locations to the lead vehicle 102 in response wireless messages 202.

At operation 1404, the vehicle 102 sends an invitation 502 to be displayed to at least a subset of the one or more other vehicles 102. The vehicle 102 may send an invitation 502 message to at least subset of the one or more other vehicles 102. The vehicle 102 may receive, from the one or more other vehicles 102, a reply message indicating acceptance to join the group of vehicles 102. The vehicle 102 may add the accepting vehicles 102 to the group of vehicles 102. In an example, the invitation 502 message is broadcast to any of the one or more other vehicles 102 within wireless range of the wireless transceiver 108. In another example, the vehicle 102 utilizes the wireless transceiver 108 to identify the one or more other vehicles 102; displays, in the HMI 302 of the vehicle 102, a listing of the one or more other vehicles 102; receives, to the HMI 302, a selection of which vehicles 102 of the one or more other vehicles 102 to invite; and sends the invitation 502 message to the selected vehicles 102 of the one or more vehicles 102. The invitation 502 may include a description 504 informing the user that the vehicle 102 is invited to join a lighting group. The invitation 502 may also illustrate sender information 508 about the inviting vehicle 102. The sender information 508 may include the information specified in the wireless messages 202, such as a name of the inviting vehicle 102, the color of inviting vehicle 102, the make of the inviting vehicle 102, etc.

At operation 1406, the vehicle 102 identifies accepting vehicles 102. In an example, the vehicle 102 may receive, from the one or more other vehicles 102, reply messages indicating acceptance to join the group of vehicles 102. In another example, the vehicle 102 may receive a request from one of the one or more other vehicles 102 to join the group of vehicles 102. If so the vehicle 102 may display, in the HMI 302, an indication of the request.

At operation 1408, the vehicle 102 creates a group of the vehicles 102. In an example, the vehicle 102 adds the vehicles 102 accepting the invitation 502 to the group of vehicles 102. In another example, the vehicle 102 receive inputs from a user of the vehicle 102 via the HMI 302 to accept the requesting vehicle 102 into the group of vehicles 102 based on the input.

At operation 1410, the vehicle 102 receives input of a collective lighting action. In an example, the vehicle 102 may receive, as input to the HMI 302, a specification of which of the exterior lights of the plurality of the group of vehicles 102 to activate, wherein to instruct the group of vehicles 102 to collectively light the area 200 includes instructing the group of vehicles 102 to turn on the specified exterior lights. In another example, the vehicle 102 may receive as input to the HMI 302, an indication 1002 to track one or more users via tracking devices 120 to illuminate the locations of the one or more tracking devices 120 and/or via or vehicle sensors 126 to illuminate the locations of movement surrounding the vehicles 102. It yet another example, the vehicle 102 may receive as input to the HMI 302, an indication to illuminate a specific location, e.g., as touch input to an HMI 302 of the vehicle 102.

At operation 1412, the vehicle 102 instructs the group of the vehicles 102 to perform the collective lighting action. In an example, the vehicle 102 may send, to the other vehicles 102 of the group, instructions of which of the exterior lights of the plurality of the group of vehicles 102 to activate, instructions to track the one or more tracking devices 120, and/or instructions to illuminate a specific location. These instructions may be sent, e.g., via wireless messages 202 from the lead vehicle 102 to the other vehicles 102 of the group. After operation 1412, the process 1400 ends.

Figure 15:
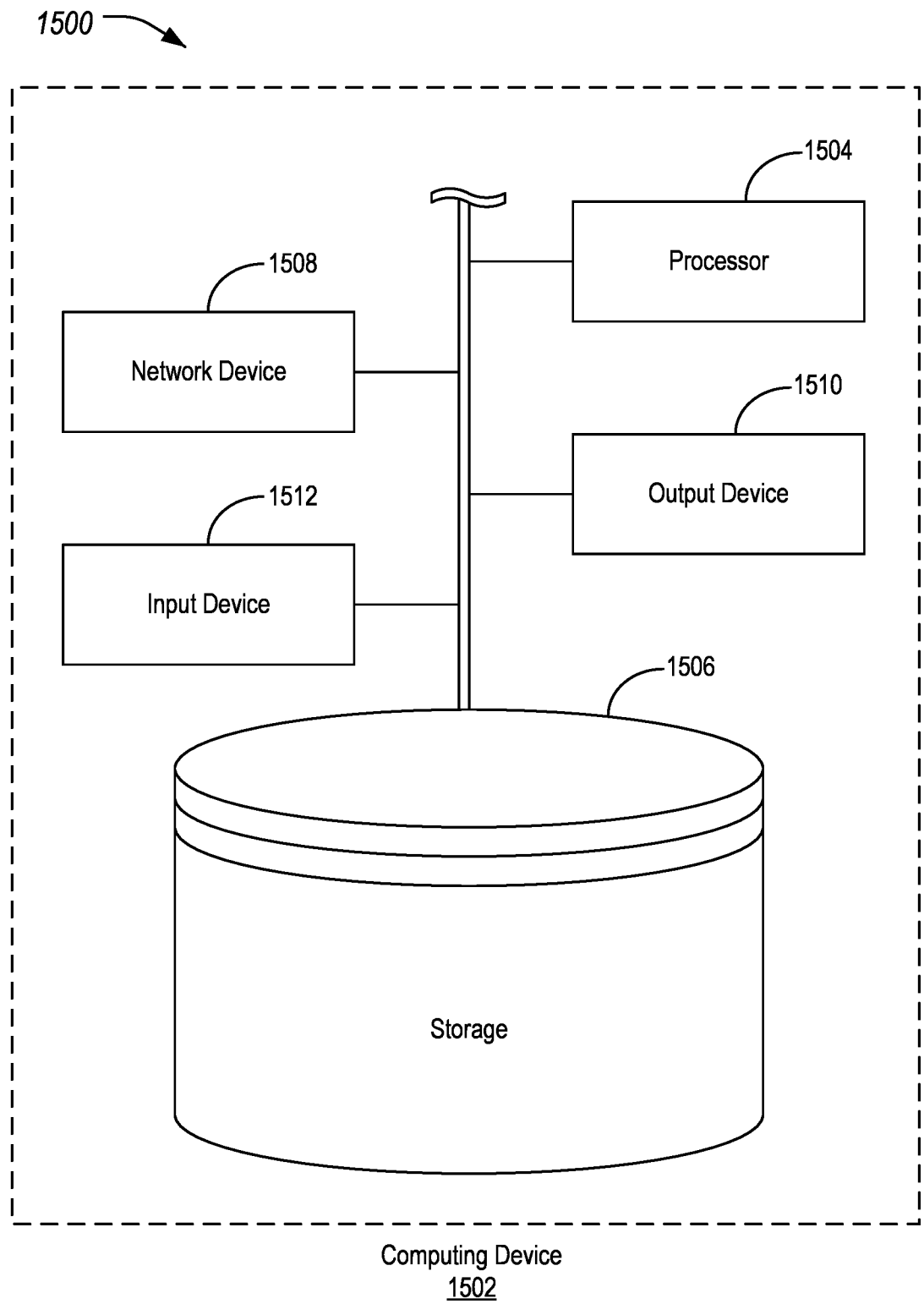
FIG. 15 illustrates an example of a computing device for use in collective zone lighting features.

FIG. 15 illustrates an example 1500 of a computing device 1502 for use in collective zone lighting features. Referring to FIG. 6, and with reference to FIGS. 1-5, the controllers 104-116 of the vehicles 102, the tracking devices 120, the drones 1202, and lanterns 1204 may be examples including such computing devices 1502. As shown, the computing device 1502 includes a processor 1504 that is operatively connected to a storage 1506, a network device 1508, an output device 1510, and an input device 1512. It should be noted that this is merely an example, and computing devices 1502 with more, fewer, or different components may be used.

The processor 1504 may include one or more integrated circuits that implement the functionality of a central processing unit (CPU) and/or graphics processing unit (GPU). In some examples, the processors 1504 are a system on a chip (SoC) that integrates the functionality of the CPU and GPU. The SoC may optionally include other components such as, for example, the storage 1506 and the network device 1508 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1504 executes stored program instructions that are retrieved from the storage 1506. The stored program instructions, accordingly, include software that controls the operation of the processors 1504 to perform the operations described herein. The storage 1506 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1510. The output device 1510 may include a graphical or visual display device, such as an electronic display screen, projector, printer, or any other suitable device that reproduces a graphical display. As another example, the output device 1510 may include an audio device, such as a loudspeaker or headphone. As yet a further example, the output device 1510 may include a tactile device, such as a mechanically raiseable device that may, in an example, be configured to display braille or another physical output that may be touched to provide information to a user.

The input device 1512 may include any of various devices that enable the computing device 1502 to receive control input from users. Examples of suitable input devices that receive human interface inputs may include keyboards, mice, trackballs, touchscreens, voice input devices, graphics tablets, and the like.

The network devices 1508 may each include any of various devices that enable the vehicles 152, traffic participants, and cloud server to send and/or receive data from external devices over networks. Examples of suitable network devices 1508 include an Ethernet interface, a Wi-Fi transceiver, a cellular transceiver, or a BLUETOOTH or BLE transceiver, an UWB transceiver or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle for use in collective zone lighting, comprising:
    a wireless transceiver; and
    a controller of the vehicle, configured to
        create a group of vehicles using wireless messaging, via the wireless transceiver, between the vehicle and one or more other vehicles, and
        instruct the group of vehicles to collectively light an area using exterior lights of a plurality of the group of vehicles, including one or more of to instruct the group of vehicles to track one or more tracking devices to illuminate locations of the one or more tracking devices or to instruct the group of vehicles to utilize sensors of the vehicle to track movement to illuminate locations of the movement.

2. The vehicle of claim 1, wherein the controller is further configured to:
send an invitation message to at least subset of the one or more other vehicles;
receive, from the one or more other vehicles, a reply message indicating acceptance to join the group of vehicles; and
add the accepting vehicles to the group of vehicles.

3. The vehicle of claim 2, wherein the invitation message is broadcast to any of the one or more other vehicles within wireless range of the wireless transceiver.

4. The vehicle of claim 2, wherein the controller is further configured to:
utilize the wireless transceiver to identify the one or more other vehicles;
display, in a human machine interface (HMI) of the vehicle, a listing of the one or more other vehicles;
receive, to the HMI, a selection of which vehicles of the one or more other vehicles to invite; and
send the invitation message to the selected vehicles of the one or more vehicles.

5. The vehicle of claim 1, wherein the controller is further configured to:
receive a request from one of the one or more other vehicles to join the group of vehicles;
display, in an HMI of the vehicle, an indication of the request;
receive input from a user of the vehicle via the HMI; and
accept the requesting vehicle into the group of vehicles based on the input.

6. The vehicle of claim 1, wherein the controller is further configured to receive, as input to an HMI of the vehicle, a specification of which of the exterior lights of the plurality of the group of vehicles to activate, wherein to instruct the group of vehicles to collectively light the area includes instructing the group of vehicles to turn on the specified exterior lights.

7. The vehicle of claim 1, wherein to instruct the group of vehicles to collectively light the area includes instructing the group of vehicles to illuminate a specific location.

8. A vehicle for use in collective zone lighting, comprising:
a wireless transceiver; and
a controller of the vehicle, configured to
create a group of vehicles using wireless messaging, via the wireless transceiver, between the vehicle and one or more other vehicles, and
instruct the group of vehicles to illuminate a specific location, including to receive the specific location as touch input to an HMI of the vehicle; and send the specific location to each of the group of vehicles.

9. A method for use in collective zone lighting, comprising:
creating, by a lead vehicle, a group of vehicles using wireless messaging, via a wireless transceiver of the lead vehicle, between the lead vehicle and one or more other vehicles; and
instructing, by the lead vehicle, the group of vehicles to collectively light an area using exterior lights of a plurality of the group of vehicles, including one or more of instructing the group of vehicles to track one or more tracking devices to illuminate locations of the one or more tracking devices or instructing the group of vehicles to utilize sensors of the vehicle to track movement to illuminate locations of the movement.

10. The method of claim 9, further comprising:
sending an invitation message to at least subset of the one or more other vehicles;
receiving, from the one or more other vehicles, a reply message indicating acceptance to join the group of vehicles; and
adding the accepting vehicles to the group of vehicles.

11. The method of claim 10, wherein the invitation message is broadcast to any of the one or more other vehicles within wireless range of the wireless transceiver.

12. The method of claim 10, further comprising:
utilizing the wireless transceiver to identify the one or more other vehicles;
displaying, in an HMI of the lead vehicle, a listing of the one or more other vehicles;
receiving, to the HMI, a selection of which vehicles of the one or more other vehicles to invite; and
sending the invitation message from the lead vehicle to the selected vehicles.

13. The method of claim 9, further comprising:
receiving, by the lead vehicle, a request from one of the one or more other vehicles to join the group of vehicles;
displaying, in an HMI of the lead vehicle, an indication of the request;
accepting the requesting vehicle into the group of vehicles based on input to the HMI.

14. The method of claim 9, further comprising:
receiving as input to an HMI of the lead vehicle, a specification of which of the exterior lights of the plurality of the group of vehicles to activate; and
instructing the group of vehicles to turn on the specified exterior lights.

15. The method of claim 9, wherein instructing the group of vehicles to collectively light the area further comprises instructing the group of vehicles to illuminate a specific location.

16. A method for use in collective zone lighting, comprising:
creating, by a lead vehicle, a group of vehicles using wireless messaging, via a wireless transceiver of the lead vehicle, between the lead vehicle and one or more other vehicles;
instructing, by the lead vehicle, the group of vehicles to collectively light an area using exterior lights of a plurality of the group of vehicles; and
instructing the group of vehicles to illuminate a specific location, including receiving the specific location as touch input to an HMI of the lead vehicle; and sending the specific location to each of the group of vehicles.

17. A non-transitory computer-readable medium comprises instructions for use in collective zone lighting that, when executed by one or more controllers of a lead vehicle, cause the lead vehicle to perform operations comprising to:
create, by a lead vehicle, a group of vehicles using wireless messaging, via a wireless transceiver of the lead vehicle, between the lead vehicle and one or more other vehicles, including to
send an invitation message to at least subset of the one or more other vehicles,
receive, from the one or more other vehicles, a reply message indicating acceptance to join the group of vehicles, and
add the accepting vehicles to the group of vehicles; and instruct, by the lead vehicle, the group of vehicles to collectively light an area using exterior lights of a plurality of the group of vehicles, including one or more of to:
- receive as input to an HMI of the lead vehicle, a specification of which of the exterior lights of the plurality of the group of vehicles to activate and instruct the group of vehicles to turn on the specified exterior lights,
- receive as input to the HMI of the lead vehicle, a specification to track one or more tracking devices to illuminate locations of the one or more tracking devices, and instruct the group of vehicles to utilize the exterior lights to illuminate the one or more tracking devices, or
- receive as touch input to the HMI of the lead vehicle, a specification to illuminate a specific location, and instruct the group of vehicles to utilize the exterior lights to illuminate the specific location.

18. The non-transitory computer-readable medium of claim 17, further comprising instructions that, when executed by the one or more controllers of the lead vehicle, cause the lead vehicle to perform operations comprising to:
- receive a request from one of the one or more other vehicles to join the group of vehicles;
- display, in the HMI of the lead vehicle, an indication of the request; and
- accept the requesting vehicle into the group of vehicles based on input to the HMI.

* * * * *